US006314721B1

(12) United States Patent
Mathews et al.

(10) Patent No.: US 6,314,721 B1
(45) Date of Patent: Nov. 13, 2001

(54) TABBED NOZZLE FOR JET NOISE SUPPRESSION

(75) Inventors: Douglas C. Mathews, Marlborough; John K. C. Low, Glastonbury, both of CT (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 09/148,207

(22) Filed: Sep. 4, 1998

(51) Int. Cl.$^7$ ................................ F02K 1/32; F02K 3/06; F02K 1/46
(52) U.S. Cl. ................................ 60/264; 60/271; 60/39.5; 239/265.19; 181/213
(58) Field of Search ................................ 60/262, 264, 271, 60/39.5; 239/265.17, 265.19; 181/213, 220

(56) References Cited

U.S. PATENT DOCUMENTS

| | | | |
|---|---|---|---|
| 3,153,319 | * 10/1964 | Young et al. | 239/265.19 |
| 3,161,257 | * 12/1964 | Young | 239/265.19 |
| 3,215,172 | * 11/1965 | Ardoin | 239/265.17 |
| 3,327,482 | * 6/1967 | Pike | 60/271 |
| 3,568,792 | * 3/1971 | Urquhart | 239/265.19 |
| 3,982,696 | 9/1976 | Gordon | 239/265.17 |
| 4,284,170 | * 8/1981 | Larson et al. | 181/213 |
| 4,401,269 | 8/1983 | Eiler | 239/265.17 |
| 4,487,017 | 12/1984 | Rodgers | 60/262 |
| 4,543,784 | 10/1985 | Kirker | 60/262 |
| 4,592,201 | 6/1986 | Dusa et al. | 60/262 |
| 4,754,924 | 7/1988 | Shannon | 239/127.3 |
| 4,786,016 | * 11/1988 | Presz, Jr. et al. | 239/265.19 |
| 4,929,088 | 5/1990 | Smith | 366/337 |
| 4,981,368 | 1/1991 | Smith | 366/337 |
| 5,129,226 | * 7/1992 | Bigelow et al. | 60/261 |
| 5,222,359 | 6/1993 | Klees et al. | 60/204 |
| 5,269,139 | 12/1993 | Klees | 60/262 |
| 5,638,675 | 6/1997 | Zysman et al. | 60/262 |
| 5,755,092 | 5/1998 | Dessale et al. | 60/262 |
| 5,761,900 | 6/1998 | Presz, Jr. | 60/262 |
| 5,775,095 | 7/1998 | Zysman et al. | 60/204 |

OTHER PUBLICATIONS

AIAA–95–2146, Analysis of Flowfield from a Rectangular Nozzle with Delta Tabs:, C. J. Steffen, Jr.; D. R. Reddy and K. B. M. Q. Zaman, Internal Fluid Mechanics Division, NASA Lewis Research Center, Cleveland, OH, 26$^{th}$ AIAA Fluid Dynamics Conference, Jun. 19–22, 1995; San Diego, CA, pp. 1–14.

"The distortion of a jet by tabs", by L. J. S. Bradbury and A. H. Khadem, Mechanical Engineering Department, University of Surrey, Guildford, England, J. Fluid Mech (1975), vol. 70, part 4, pp. 801–813.

* cited by examiner

Primary Examiner—Ted Kim
(74) Attorney, Agent, or Firm—Monica Krasinski

(57) ABSTRACT

The present invention relates to a gas turbine engine exhaust nozzle for suppressing jet noise. The nozzle has an arrangement of tabs that extend in radially inward and outward directions. The tabs cause the formation of vortices which pull into mixing engagement the exhaust gas streams from the core and fan ducts and the ambient air. In addition, various construction details are developed for the tab arrangement including tabs that are directed radially inwardly and outwardly, and tabs that are continuous with the nozzle duct therebetween.

6 Claims, 4 Drawing Sheets

TABBED NOZZLE FOR JET NOISE SUPPRESSION

The invention was made under a U.S. Government contract, and the U.S. Government has rights herein.

TECHNICAL FIELD

This invention relates to gas turbine engine nozzles, and more particularly to nozzle constructions for jet noise suppression.

BACKGROUND ART

Jet noise is created by the turbulent mixing of high velocity engine gases that emanate from the rear of a modern gas turbine. The turbulent mixing occurs between the high velocity gases and between the high velocity gases and ambient. The high velocity exhaust gases are typically a mixture of two sources—the hot gases resulting from the burnt fuel within the turbine's core flow (primary source) and cooler air discharged from fan bypass ducts (secondary source). The velocity of the core flow is typically in the order of 1600 ft/sec, while the velocity of the fan bypass flow is typically in the order of 1000 ft/sec. The two flows when fully mixed result typically in a mixed jet velocity of 1200 ft/sec. The velocity gradient that exists at the different interfaces or shear regions, namely between the downstream mixed and the fan exhaust flows, between the fan exhaust flow and ambient, and between the core flow and ambient, results in flow disturbances. These flow disturbances or turbulence results in jet noise. The turbulent flow in the shear regions between the high velocity gases and the ambient air produce a significant component of the high levels of noise that are objectionable for aircraft operation from commercial airports.

Due to the adverse impact noise has on the environment, many countries and airports have imposed increasingly strict noise reduction criteria on aircraft. In the United States, the Federal Aviation Administration (FAA) has imposed strict noise reduction limits on aircraft that are currently in use. In addition, the restrictions imposed by various airports range from financial penalties and schedule restrictions to an outright ban on the use of the aircraft. An effective and efficient noise reduction solution is necessary since these restrictions would severely cut short the useful life for certain types of aircraft that commercial airlines are currently using.

Turbofan engines are categorized as either low bypass ratio or high bypass ratio, based on the ratio of bypass flow to core flow. Jet noise is a well-known problem with low bypass ratio engines. In the low bypass ratio jet engines, the exhaust gases emanating from the core and fan bypass ducts usually mix before they exit the engine's exhaust nozzle, where they form a high speed plume. The plume rips or shears against the slower ambient air as it rushes by creating flow turbulence and thus jet noise.

Typically, newer jet engines are high bypass ratio engines which have lower (but still significant) levels of jet noise than low bypass ratio engines. Most high bypass ratio engines have separate flow nozzle exhaust systems. High bypass ratio engines have much larger fan flows, and overall larger total engine flow rates than the low bypass ratio engines. Thrust is obtained through larger mass flow rates, and lower jet velocities than low bypass ratio engines. Due to lower jet velocities, the level of jet noise is decreased in these high bypass ratio engines as compared to the low bypass ratio engines.

However, jet noise remains a problem for modern high bypass ratio engines especially during operation at high engine power levels. High engine power is typically associated with aircraft take-off scenarios when the engine produces a high thrust and results in high velocity exhaust air. The FAA imposes strict noise requirements at high power. Modern, high bypass ratio engines have to comply with the requirement to provide ever-higher thrusts to power new and growth versions with higher takeoff gross weight of the aircraft. As a result, the modern, high bypass ratio engines operate at higher jet temperatures and pressure ratios and generate higher jet velocities and thus higher jet noise levels than earlier models of high bypass ratio engines.

In the prior art of jet noise suppression, different structures have been devised to reduce noise. For example, a lobed mixer concept has been used in the past for the long duct, common flow exhaust systems such as those used in Pratt & Whitney's JT8D engine family.

Examples of such noise suppression structures are found in U.S. Pat. Nos. 4,401,269 and 5,638,675, both assigned to the assignee of the present application. The '269 patent to Eiler and the '675 patent to Zysman et al disclose lobed mixers for a gas turbine engine. The lobed mixer includes axially and radially extending chutes. The chutes act as gas conduits whereby relatively cool, low velocity fan air is directed into the chutes and in turn into the hot, higher velocity core gas flow. The lobed mixer thus increases the mixing of the core and fan bypass gases.

While the long duct, common flow exhaust systems of the prior art, as represented by the exhaust nozzles of the JT8D engine family, the '269 and '675 patents, have met with great commercial acceptance in the aerospace industry, the assignees of the present invention are constantly looking to improve the separate flow exhaust nozzle systems of gas turbine engines, specially during operation of the engines at high power levels. Other studies and nozzle configurations including tab concepts have been proposed and analyzed to understand the effects and physical phenomenon associated with the placement of tabs at the nozzle exit. However, heretofore nozzle configurations incorporating tabs for jet noise suppression have not resulted in a viable commercial product. Jet noise suppression improvements using nozzle tabs have to be lightweight, economical, easy to manufacture and incorporate in modern gas turbine engines. Further, nozzles incorporating tabs should not adversely impact engine thrust or performance.

DISCLOSURE OF THE INVENTION

A primary object of the present invention is the provision of jet noise suppression, especially during engine operation at high power levels.

A further object of the present invention is the provision of jet noise suppression without the addition of appreciable thrust losses.

Another object of the present invention is the provision of a jet noise suppression system that requires minimum weight penalty for the gas turbine engine.

According to the present invention, a gas turbine engine exhaust nozzle for suppressing jet noise having an arrangement of nozzle tabs that are directed and extend in a radially inward and radially outward direction for increasing the effectiveness of the mixing process between exhaust gas streams and the ambient air. The nozzle tabs are disposed circumferentially on the exit of an exhaust nozzle. A preferred embodiment of the present invention is an alternating arrangement of tabs directed radially outwardly from the exhaust nozzle, tabs which are a smooth, continuous extension of the exhaust nozzle duct, tabs directed radially inwardly into the exhaust nozzle, followed by tabs which are a smooth, continuous extension of the exhaust nozzle duct. This alternating arrangement is repeated along the circumference of the nozzle exit. The nozzle tabs are not limited to a particular shape and may comprise of a variety of shapes such as triangular or round.

The present invention alters flow disturbances, which results in noise, by causing vortices to be set up by the tabs between the flow streams of the exhaust nozzles and ambient air. These vortices facilitate the mixing of the core and fan flow streams by drawing the fan flow stream radially inwardly into the core flow and alternatively by drawing the core flow radially outwardly into the fan flow, thus increasing the effectiveness of the mixing process. The nozzle tabs of the present invention are disposed such that there is a predetermined angular relationship between the tabs and the exhaust nozzle. The tab angles of protrusion radially into or out of the flow streams are determined to minimize the introduction of thrust losses for the level of noise reduction achieved. The height and number of tabs is a function of nozzle geometry.

The present invention has utility in that it allows for jet noise suppression with minimal impact to engine thrust and performance. The present invention reduces jet noise close to the exit end of the engine due to the alteration of flow disturbances proximal to the exhaust nozzle. Further, the present invention has a minimal impact on the weight of the gas turbine engine.

The foregoing and other objects, features and advantages of the present invention will become more apparent in the following detailed description of the best mode for carrying out the invention and from the accompanying drawings that illustrate an embodiment of the invention.

BEST MODE FOR CARRYING OUT THE INVENTION

Figure 1:
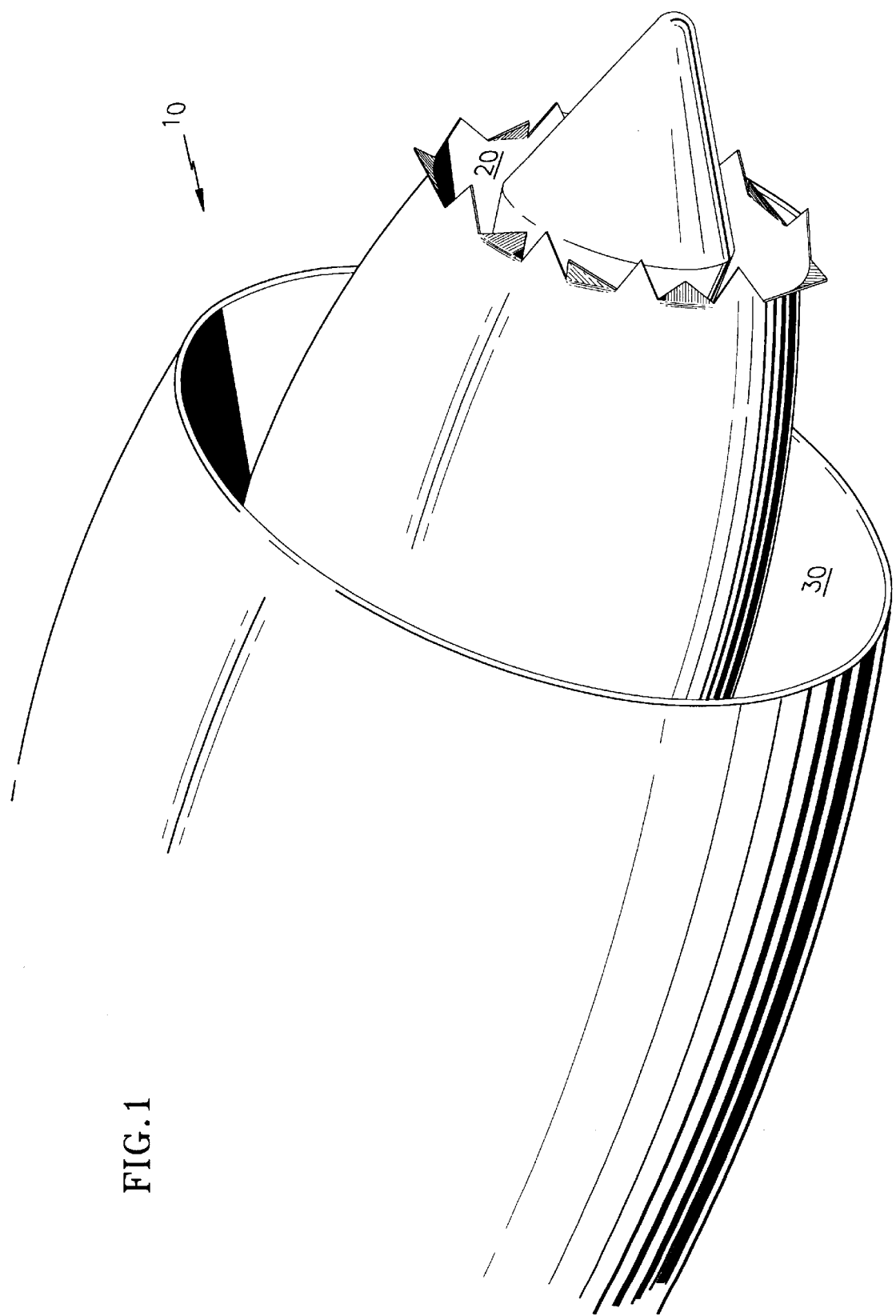
FIG. 1 is a perspective view of the exit end of a gas turbine engine showing a view of a tabbed exhaust nozzle of the present invention.

Referring to FIG. 1, in a typical turbofan engine 10, having a longitudinally extending central axis, air enters the upstream end of the engine. As is well known in the art and, therefore, not illustrated herein, as air enters the front of the jet engine it passes through the fan and is split between a primary or core flow and a secondary or bypass flow. The primary flow first enters a low pressure compressor then a high pressure compressor. The air is then mixed with fuel in a combustion chamber and the mixture is ignited and burned, thereby increasing its pressure and temperature. The resultant combustion products then flow into a high pressure turbine and a low pressure turbine which extract energy from the combustion gases to turn the fan and compressor. The gases then expand through an inner exhaust nozzle 20 to produce useful thrust. The bypass stream is compressed by the fan, flows outside the core of the engine through an annular duct concentric with the core engine and is exhausted through an outer exhaust nozzle 30 as additional useful thrust. The two concentric flow streams join downstream of the turbine exhaust area of the engine. The two flows then mix together and with the surrounding ambient flow as described hereinafter.

Figure 2:
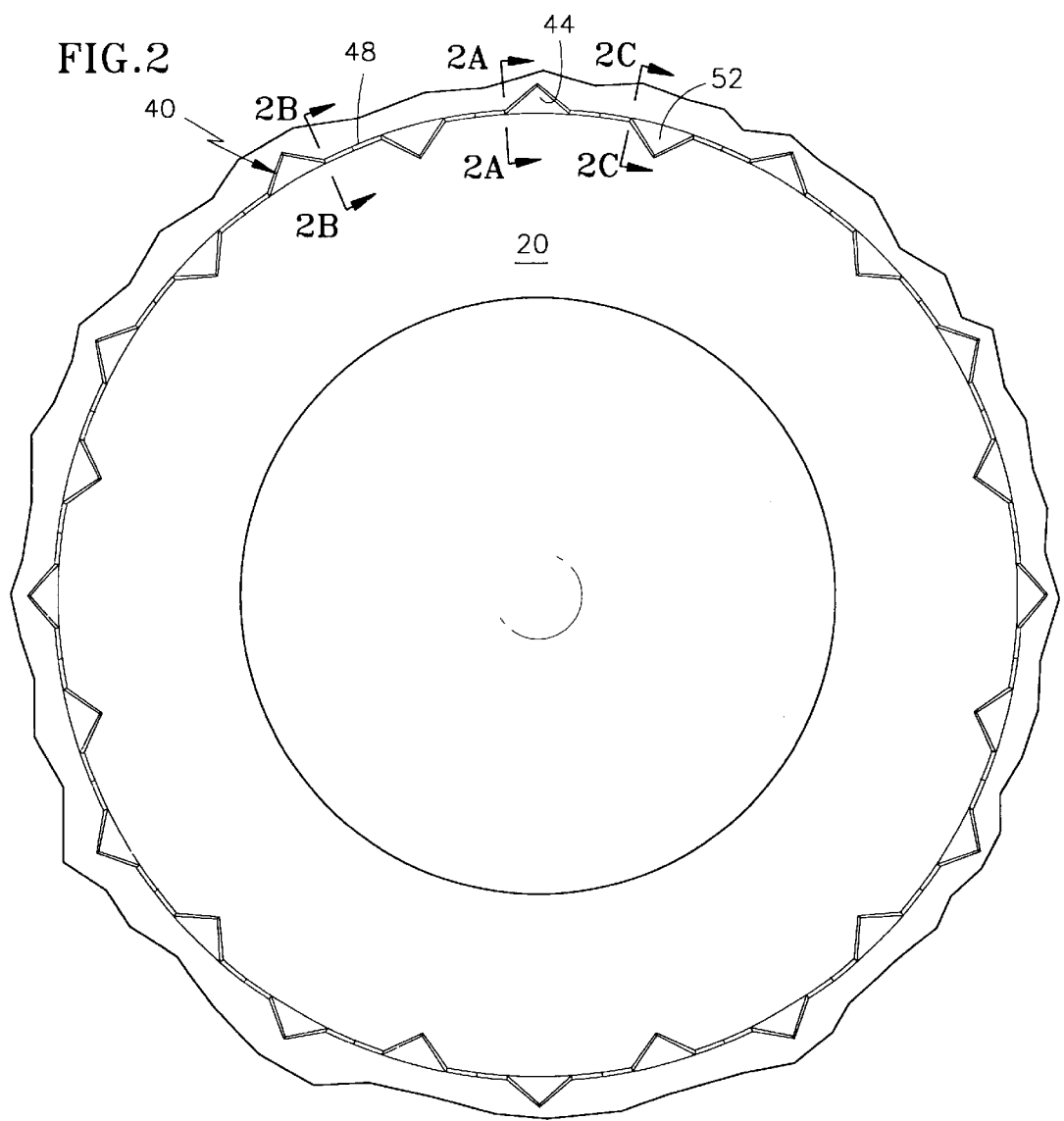
FIG. 2 is an end view showing the tab arrangement of the present invention disposed on the primary exhaust nozzle of FIG. 1.

Referring to FIG. 2, the preferred embodiment of the present invention is an arrangement of alternating tabs 40. This arrangement of tabs includes tabs 44 that are directed radially outward and extend into the fan flow stream, tabs 48 which are a smooth, continuous extension of the exhaust nozzle duct 20, tabs 52 that are directed radially inward and extend into the core flow stream, followed by tabs 48 which are a smooth continuous extension of the exhaust nozzle duct. This alternating arrangement of tabs is repeated in sequence and is disposed along the entire circumference of the nozzle 20 exit.

Figure 2A:
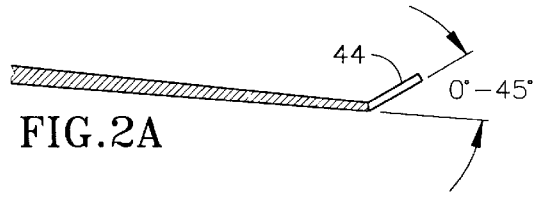
FIG. 2A is a sectional view taken along the line 2A—2A of FIG. 2.
Figure 2B:
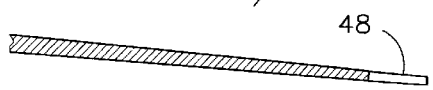
FIG. 2B is a sectional view taken along the line 2B—2B of FIG. 2.
Figure 2C:
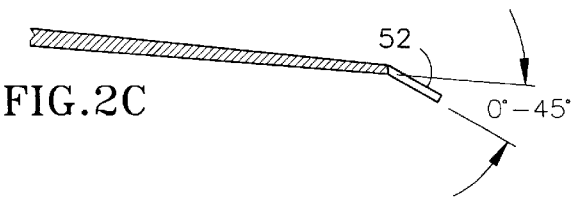
FIG. 2C is a sectional view taken along the line 2C—2C of FIG. 2.

Referring to FIG. 2A and 2C, the tabs 44, 52 directed radially outwardly and inwardly with respect to the core and fan flow streams have an angular relationship with respect to the gas flow streams exiting through the nozzles 20, 30. The tabs protrude at predetermined angles into either the core or fan flow stream. The angular orientation for the nozzle tabs of the present invention were determined to minimize any adverse impact to engine thrust. In the exemplary embodiment of the present invention, the angle of protrusion can range from zero to forty-five degrees (45°). Angles beyond 45° adversely impact engine thrust.

Figure 3:
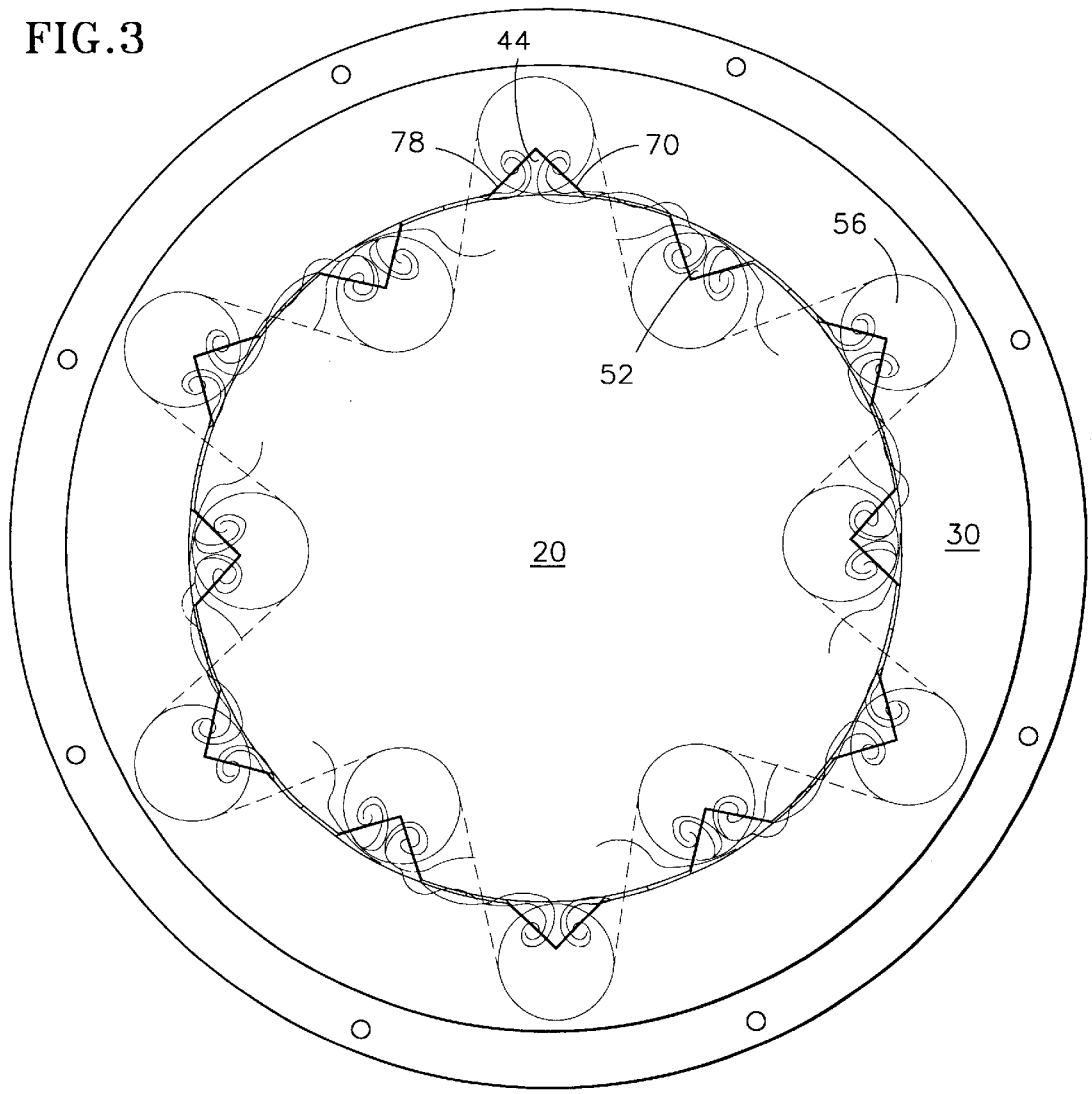
FIG. 3 is a view similar to FIG. 2 showing the interaction between the gas streams that exit the exhaust nozzle and the ambient air.

Referring to FIG. 3, the vortices 56 created by the tabs 40 on the exhaust nozzle of the present invention pull the core flow stream and fan flow stream into mixing engagement. The tabs 44 that are directed radially outwardly and extend into the fan flow stream create vortices that cause the core flow emanating from inner exhaust nozzle 20 to expand or be drawn into the secondary flow emanating from outer exhaust nozzle 30. The tabs 52 that are directed radially inwardly and extend into the core flow create vortices that cause the fan flow to penetrate or be drawn into the core flow. The tabs 48 that are continuous extensions of the exhaust nozzle prevent the outwardly and inwardly directed core and fan flows from interfering with each other.

Figure 4:
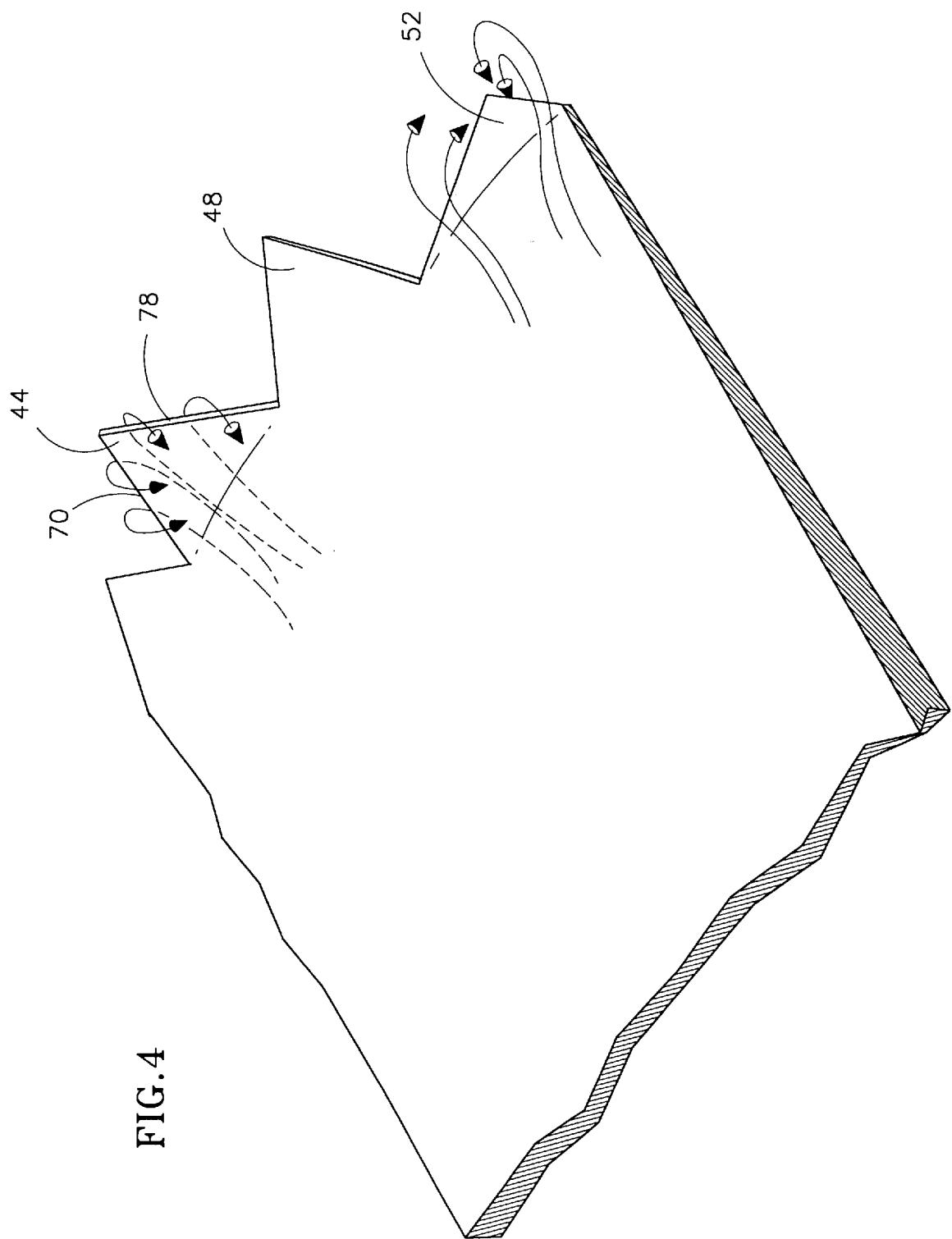
FIG. 4 is schematic view, partly broken away and partly in section, of the exit end of the exhaust nozzle showing further details of the interaction between the gas flow streams caused by the tab arrangement of the present invention.

Referring to FIGS. 3 and 4, each tab 44 that is directed radially outwardly produces a pair of streamwise vortices that rotate in opposite directions. The vortices cause the mixing of the core flow and fan flow. Effective mixing between the two flow streams alters flow disturbances between the core flow and fan flow interfaces and results in attenuating jet noise. The right edge 70 of tab 44 creates a vortex having a flow direction which is counter-clockwise. This vortex pulls the core flow outwardly into the fan flow. The left edge 78 of the tab 44 creates a vortex having a flow direction which is clockwise. This latter vortex pulls the core flow outwardly into the fan flow.

Similarly, a pair of streamwise vortices that rotate in opposite directions are created by each tab 52 that is directed radially inwardly. The vortices created by the tabs 52 draw the fan flow radially inwardly into the core flow, thus pulling the fan low and core flow into mixing engagement.

The strength of this pair of vortices is approximately equal to the circulation or degree of mixing defined according to the following equation:

circulation=2 U h tan where "U" is the velocity difference between the velocity of the core flow and the fan flow, "h" is the height of a tab and alpha ($\alpha$) is the angle of protrusion radially inwardly or outwardly of the flow stream.

Thus, the circulation of the exhaust flows is a function of the difference of the velocities of flow streams that are mixing, the height or protrusion of the tabs into the flow streams and the tangent of the angle of protrusion of the tabs into or out of the flow streams. The angle of protrusion into the flow streams may be in a range of zero degrees to forty-five degrees (45°). Angles greater than forty-five degrees may add appreciably to the thrust losses due to local flow separation which is detrimental to the performance of the nozzle. Even though the angular orientation of the tabs can range from 0 to 45°, for practical purposes the angular orientation range is from 0 to 30°.

In accordance with the exemplary triangular embodiment of the present invention, the height of the tabs is a function of the circumferential size of the tabs. The maximum height of the triangular tabs can be represented by the following equation:

$h=((\pi d)/N)/2$ where $\pi d$ is the circumferential size of the tabs and N is the number of tabs disposed around the exit nozzle.

In the turbofan engine industry, the effect of noise on humans is expressed in terms of an effective perceived noise level, EPNdB, expressed in decibels. At high mixed jet velocities in the range of 1200 feet per second (1200 ft/sec), the jet noise suppression achieved by the present invention is over three EPNdB (3 EPNdB). These higher jet velocities are achieved at take-off when noise suppression is desired. Thus, the present invention provides the required level of jet noise suppression during engine operation at high power levels.

The tabbed nozzle of the present invention may be used in engines having both a primary core and a secondary fan nozzle as well as in engines having only a primary core exhaust nozzle. For bypass engines, the tab arrangement of the present invention can be disposed either on the exit end of both the primary and secondary nozzle or on any one of the two nozzles.

The tabbed nozzle of the present invention may be implemented in a variety of ways by any of a number of arrangements of tabs extending in radially inward and outward directions with a substantial angular offset from one another. As described hereinabove, the tabs may form an alternating arrangement as disclosed or alternatively some other combination of radially directed tabs and tabs continuous with the surface of the nozzle. Other combinations of the tabs may include a plurality of radially inwardly directed tabs adjacent to a plurality of radially outwardly directed tabs.

The tabs may be spaced from each other or may be adjacent each other. The tabs have been described and illustrated as being triangular in shape. The triangular shape is purely exemplary, it is to be understood that other shapes may be utilized in light of the teachings herein.

It will also be understood by those skilled in the art that the above number of tabs described are derived for particular exhaust nozzle size and geometries. The number of tabs may be adjusted to suit different nozzles.

All of the foregoing embodiments are representative of the preferred embodiment, it suffices for the present invention, that a gas turbine engine exhaust nozzle for suppressing jet noise includes an arrangement of nozzle tabs that are directed and extend in radially inward and outward directions, for mixing the exhaust flow streams and the ambient.

Although the invention has been shown and described with respect to detailed embodiments thereof, it should be understood by those skilled in the art that various changes in form and detail thereof may be made without departing from the spirit and the scope of the claimed invention.

What is claimed is:

1. An exhaust nozzle system in a gas turbine engine for suppressing jet noise, the engine having a longitudinally extending central axis, concentric inner and outer flow paths for carrying inner and outer fluid flow streams through the engine, an inner and outer nozzle to discharge the inner and outer flow streams to ambient, at least one of the nozzles comprising:

an arrangement of tabs disposed circumferentially about the nozzle, the arrangement of tabs comprising a repeated sequence of tabs, wherein the sequence includes tabs directed radially outward from the exhaust nozzle with respect to said central axis, tabs directed radially inward from the exhaust nozzle with respect to said central axis, and continuous tabbed extensions of the nozzle therebetween, such that the tabs create vortices which pull into mixing engagement the nozzle flow streams and a portion of ambient air.

2. The exhaust nozzle system of claim 1, wherein the tabs directed radially inward and outward have a substantial angular offset from one another.

3. The exhaust nozzle system of claim 2, wherein the tabs directed radially inward and outward protrude into or out of the nozzle flow stream at an angle of up to forty-five degrees (45°).

4. The exhaust nozzle system of claim 1, wherein the tabs are triangular in shape.

5. The exhaust nozzle system of claim 4, wherein the arrangement of triangular-shaped tabs having a circumferential size, further comprises tab orientations to maximize the degree of mixing of flow streams, the degree of mixing being a function of the product of the velocity difference between the inner and outer flow streams, the height of the tabs and tangent of the angle of protrusion of the tabs into or out of the flow stream.

6. The exhaust nozzle system of claim 5, wherein the height of the tabs further comprises a maximum size that is limited by the ratio of the circumferential size of the tabs and the number of tabs disposed along the nozzle.

* * * * *